United States Patent
Hobbs

[15] 3,643,074
[45] Feb. 15, 1972

[54] ADAPTIVE FILTER USING HEADING CORRECTION

[72] Inventor: James Hobbs, Overland Park, Kans.
[73] Assignee: Butter National Corporation, Oak Brook, Ill.
[22] Filed: Sept. 15, 1969
[21] Appl. No.: 857,724

[52] U.S. Cl. .................................. 235/150.27, 343/107
[51] Int. Cl. .................................. G06g 7/12, G01c 21/20
[58] Field of Search .................. 343/107, 112.1, 112.5; 235/150.2, 150.26, 150.27

[56] References Cited

UNITED STATES PATENTS

| | | | |
|---|---|---|---|
| 3,414,901 | 12/1968 | Perkins et al. | 343/107 |
| 3,234,552 | 2/1966 | Bostwick | 343/107 |
| 3,515,342 | 6/1970 | Brunk | 235/150.27 |
| 3,533,060 | 10/1970 | Aker | 235/150.27 |
| 3,534,399 | 10/1970 | Hirsch | 235/150.27 |

Primary Examiner—Eugene G. Botz
Assistant Examiner—Edward J. Wise
Attorney—Hill, Sherman, Meroni, Gross & Simpson

[57] ABSTRACT

An aircraft navigation system which has a variable response that is adjustable with the changes in heading relative to the known radio bearing so as to filter out and remove signal frequency components which are greater than may be obtained with an aircraft having a particular airspeed and heading relative to the radio course.

12 Claims, 4 Drawing Figures

INVENTOR.
James Hobbs

ADAPTIVE FILTER USING HEADING CORRECTION

CROSS REFERENCES TO RELATED APPLICATIONS

U.S. Pat. No. 3,414,901, entitled "Aircraft Navigation System", assigned to the assignee of the present invention and invented by Earl Stuart Perkins and Myron L. Anthony, discloses an aircraft navigation system wherein the response of the system varies as a function of the distance from a navigation transmitter so as to eliminate signal frequency components which are higher frequency than could be obtained with the navigation system in the aircraft at a particular distance.

BACKGROUND OF THE INVENTION

1. Field of the Invention

This invention relates, in general, to aircraft navigation systems.

2. Description of the Prior Art

Aircraft navigation systems such as disclosed in U.S. Pat. No. 3,414,901 utilize filtering of the navigation signals to eliminate frequency components which are greater than the maximum frequency of navigation signals. In U.S. Pat. No. 3,414,901 a system is disclosed wherein the response of a filter is varied as a function of distance from the radio transmitter.

SUMMARY OF THE INVENTION

The present invention discloses an aircraft navigation system which modifies the distance proportional filtering of U.S. Pat. No. 3,414,901 in an additional manner so as to limit the maximum response of the system not only as a function of distance from the station but also as a function of the heading of the aircraft relative to the selected radio beam. Thus, if the aircraft is flying along the beam, its transverse velocity relative to the beam will approach zero and the maximum rate of change of error signals in the navigation signal will be much less than if the aircraft is flying at 90° to the beam wherein the maximum error can vary as a function of the aircraft's airspeed.

In the present invention the aircraft's heading relative to the beam is detected and the response of a filter through which the navigation signal is processed is varied as a function of the aircraft's heading and distance relative to the beam.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure, and in which.

DETAILED DESCRIPTION OF THE PREFERRED EMBODIMENT

Figure 1:
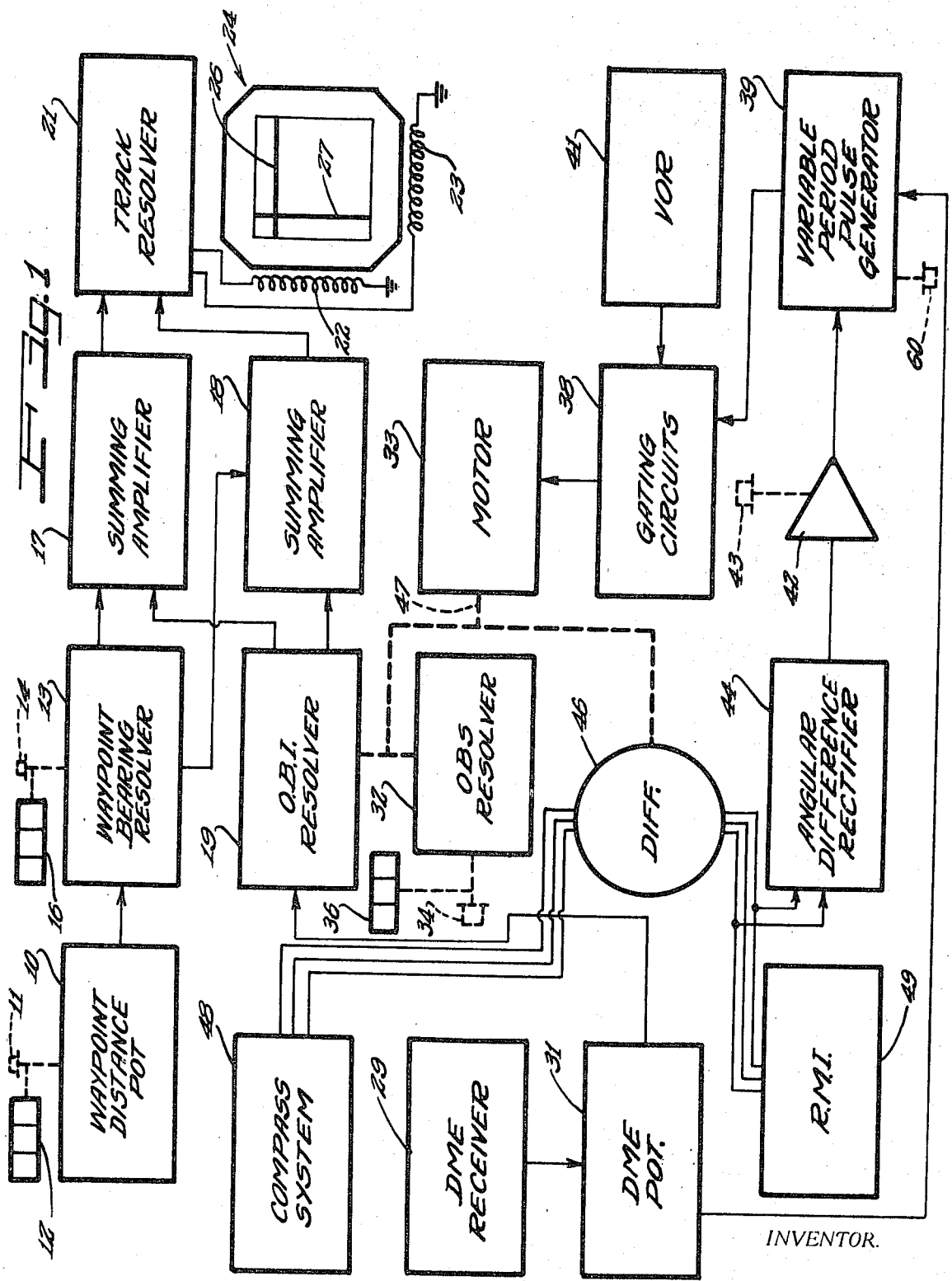
FIG. 1 is a block diagram of the navigation system of this invention using adaptive filtering to correct for heading variations relative to the radio beam.
Figure 2:
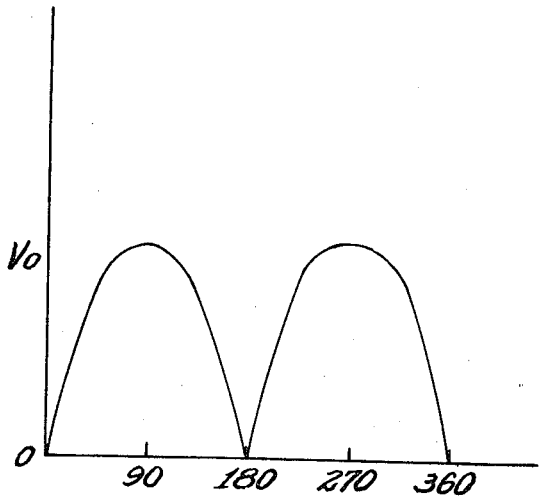
FIG. 2 is a plot of the maximum transverse velocity of aircraft relative to a beam.

FIG. 1 illustrates the improved navigation system of this invention. For purposes of illustration, an area navigation system is shown in FIG. 1, but it is to be realized that the principles of the invention are also applicable to navigation systems which do not comprise area navigation. By way of example, if the way point bearing resolver and way point distance pot are set to zero, the system of FIG. 1 will operate as a system referenced to ground DME and VOR receivers.

A detailed description of an area navigation system that may be utilized with this invention is given in U.S. Pat. No. 3,414,901 and will not be described in detail herein. In general, an area navigation system allows an aircraft to select any location as a reference even though no radio equipment is located at that point and the aircraft's orientation relative to the fixed selected way point will be indicated. The coordinates of the way point are set into the navigation system comprising the distance of the way point from a navigation transmitting site and also the way point's bearing relative to the navigation transmitting site.

For example, the distance of the way point may be set in the way point distance potentiometer 10 by a knob 11 which also controls an indicator 12 to indicate the distance of the way point from a navigation transmitting site having DME and VOR transmitters. The output of the way point distance potentiometer 10 supplies an input to a way point bearing resolver 13 which is set by a knob 14 to the known bearing of the way point from the navigation transmitting station. An indicator 16 indicates the known bearing set into the way point bearing resolver by the knob 14. A pair of summing amplifiers 17 and 18 receive X- and Y-coordinate outputs from the way point bearing resolver 13. The summing amplifiers 17 and 18 also receive inputs from the omnibearing indicator resolver 19 of the aircraft's navigation system. The summing amplifiers 17 and 18 supply inputs to a track resolver 21 which produces a first output that is supplied to a first meter movement 22 and a second output which is supplied to second meter movement 23 of a situation presentation indicator 24 which has meter movements 26 and 27, respectively. A distance-measuring receiver 29 has an output distance-measuring potentiometer 31 which supplies an input to OBI resolver 19. An omnibearing selector resolver 32 receives an input from motor 33 which also supplies a shaft input to the OBI resolver 19. A knob 34 allows a particular radial from a VOR station to be selected which is presented on the indicator 36. The motor 33 receives an input through gating circuits 38 which receive an input from a variable period pulse generator 39. The distance-measuring pot 31 supplies an input to the variable period pulse generator 39. A VOR receiver 41 is connected to the gating circuits 38 and controls a particular one of the gates included in the gating circuits 38 to control the direction of rotation of the motor 33 when an error signal is present in the system. An amplifier 42 is connected in the input of the variable period pulse generator 39 and has a gain-controlling knob 43. An angular difference rectifier 44 receives an input from a differential 46 which also is controlled by the output shaft 47 of the motor 33. The differential 46 receives an input from the compass system 48 and supplies an output to a remote indicator RMI 49.

A conventional omnibearing selector 32 receives an input from the VOR receiver 41. The variable period pulse generator 39 comprises a variable frequency generator which puts out pulses whose periods vary as the control signal. Such generator may be of the type described in Fairchild Semiconductor Linear Integrated Circuits Applications Handbook, Copyright 1967, Library of Congress Catalog No. 67-27446, at pages 162–163. The gating circuits 38 comprises merely a simple gate for allowing the output of the generator 39 to pass to the motor 33 when the output of the VOR is other than zero. In other words, when the VOR output is zero the motor 33 will not run because the gating circuits do not allow an input to pass to the motor. However, when the output of the VOR 41 is other than zero the gating circuits 38 will be closed so that the motor 33 may run at a speed determined by the output of the pulse generator 39.

The system of FIG. 1 varies the response of the motor 33 as a function of the distance from the DME station in that the output of the DME pot 31, which is proportional to the distance from the DME station, is supplied to the variable period pulse generator to control the motor 33 which drives the OBI resolver 19. Thus, the response of the navigation system is varied as the distance from the transmitting station increases. As pointed out in detail in U.S. Pat. No. 3,414,901, if the aircraft has a maximum speed the response of the system may be varied as a function of distance from the station in an inverse manner so that spurious errors in the signal may be removed. For example, when the aircraft is close to the station the aircraft may move relative to the beam at a relatively high rate. On the other hand, when the aircraft is far from the station the aircraft cannot move relative to a selective radial as rapidly as can occur when close to the station. The reason for this is that as the distance from the station increases a particular radial increases in width as a function of distance from the station and the change in the radio signal is limited as a function of the inverse distance of the aircraft from the station as explained in detail in U.S. Pat. No. 3,414,901.

The present invention modifies the response of the navigation system as a function of the aircraft's heading relative to the selected radial so that at times when the aircraft is flying parallel or on a selected radial the response will be substantially decreased from that which occurs when the aircraft is flying across radials at 90°.

Figure 4:
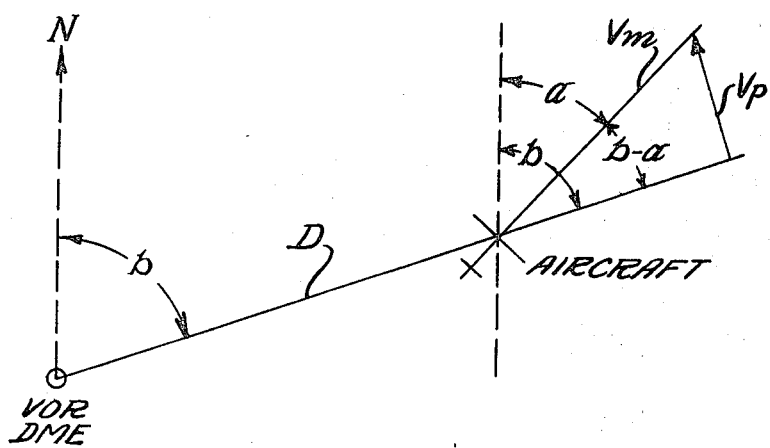
FIG. 4 is a plan view illustrating the relationship between the aircraft and navigation station.

FIG. 4 illustrates a VOR and DME station and an aircraft spaced a distance $D$ from the station. The aircraft's heading is indicated by $a$, the VOR radio bearing is identified $b$, the maximum speed of the aircraft type is indicated $V_m$, the cross radial velocity component of the aircraft is indicated by $V_p$, $W$ is equal to instantaneous angular velocity, $W_m$ is equal to maximum angular velocity for aircraft type.

The angular velocity $W$ is equal to $V_p/D$     (1)

$V_p$ is equal to $V_m \sin(b-a)$     (2)

Therefore:

$W = (V_m/D) \sin(b-a)$     (3)

and:

$W_m = V_m/D$     (4)

Therefore:

$W/W_m = \sin(b-a)$     (5)

Thus, as illustrated in equation (3) the instantaneous angular velocity varies as a function of distance from the VOR station and aircraft heading. As the aircraft heading changes, the cross radial velocity $V_p$ varies from zero to maximum, $V_m$. When the difference between the VOR radial bearing and the aircraft heading ($b-a$) is 0° (or 180°) the angular velocity is zero and when the angular difference is 90° (or 270°) it is maximum, $W_m$.

Equation (5) shows the ratio of the instantaneous angular velocity to the maximum angular velocity (for the particular aircraft type) is equal to the sine of the angular difference between the VOR radial bearing and the aircraft heading. This function can be used in a relatively simple manner to provide increased filtering when flying along radials.

The apparatus illustrated in FIG. 1 provides for the addition of the differential 46 which is driven by the motor 33 and which receives magnetic compass information (the angle $a$) which is supplied to the differential. The electrical output voltage of the differential is a function of the difference between the VOR radial bearing and the aircraft heading. This information may also be utilized to drive the RMI 49 which may be used with a nonautomatic navigation receiver.

The amplitude of the voltage between two of the output leads of the differential is proportional to the sine of the difference angle ($b-a$) and this voltage is fed to the rectifier 44 and the output of this rectifier will vary as the sine of the difference angle.

The variable period pulse generator receives the output of the amplifier 42 which drives the variable period pulse generator 39. The output of the amplifier 42 provides additional filtering in the system proportional to the aircraft's heading relative to the selected radial. A current level adjustment may also be included for setting aircraft speed. This may be accomplished with the knob 60.

Figure 3:
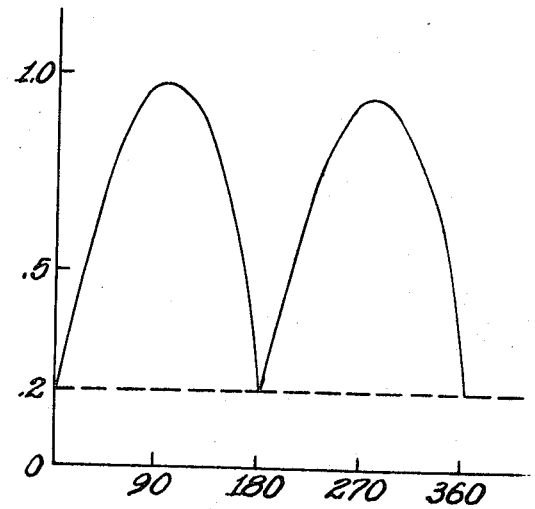
FIG. 3 is a plot of the response of a system according to this invention.

FIG. 3 illustrates the proposed variation in maximum angular velocity as a function of the difference angle. At 90° and 270° the maximum angular velocity is equal to the present maximum. But when heading along a radial (to or from) at 0° and 180° difference angle the maximum angular velocity would be reduced to about 20 percent of the maximum angular velocity. This factor allows a possible plus or minus 5 percent variation in the compass voltage and allows for the effects of crosswind correction angles.

The results of the heading angle correction system of this invention is to improve the prior system such as disclosed in U.S. Pat. No. 3,414,901 so that the response varies as a function of heading and the accuracy is improved substantially. Therefore, when the aircraft is flying parallel or on a selected radial the maximum error signal is substantially decreased than when the aircraft is flying at right angles to the selected radial. This is adjusted automatically in the system of FIG. 1 so that the overall accuracy of the system is substantially increased.

It is seen that this invention provides a new and novel navigation system and although it has been described with respect to preferred embodiments, it is not to be so limited as changes and modifications may be made therein, which are within the full intended scope as defined by the appended claims.

I claim as my invention:

1. An aircraft navigation system comprising, indicating means for indicating changes in the position of an aircraft, receiver means for developing a navigation signal in response to a received selected path signal from a navigation station, coupling means coupling said receiver to said indicating means, and a correcting and compensating system for limiting the maximum response of said indicating means as a function of the heading of the aircraft relative to said selected path.

2. An aircraft navigation system comprising, indicating means for indicating changes in position of an aircraft, first receiver means for developing a signal in response to a received selected path signal from a navigation station, second receiving means for developing a signal proportional to distance from said navigation station, heading developing means on said aircraft, combining means for developing a signal proportional to the sine of the angular difference between the heading of the aircraft and said selected path, coupling means coupling said indicating means to said first and second receiving means and the response of the coupling means varied as the output of said combining means.

3. An aircraft navigation system according to claim 2 wherein said combining means comprises, a differential synchrotransformer receiving an input from said coupling means, and a heading calculator supplying an input to said differential synchrotransformer.

4. An aircraft navigation system for limiting the rate of the maximum response of the navigation as a function of the aircraft's heading relative to a radio beam comprising, means for developing a signal indicative of the aircraft's heading, means for developing an signal indicative of the angle of the radio beam, means for developing a signal proportional to the sine of the difference between the angle of the radio beam and the aircraft's heading, and computer variable output means receiving said signal proportional to the sine of the difference between the angle of the radio beam and the aircraft's heading and connected to said navigation system to control the rate of response.

5. A navigation system according to claim 4 comprising, means for feeding the aircraft's airspeed into said computer variable output means so that the maximum rate of response is additionally controlled as a function of airspeed.

6. A navigation system according to claim 4 wherein said navigation system includes a distance-measuring receiver which supplies an input to said computer variable output means and the computer variable output means controls the rate of response of said navigation system as an inverse function of distance of the aircraft from said distance-measuring receiver.

7. An aircraft navigation system comprising, indicating means, a navigation receiver producing an output indicative of the aircraft's position relative to a radio path, a distance-measuring receiver producing an output equal to the aircraft's distance from a ground location, a compass system producing an output equal to the aircraft's heading, and combining means receiving the outputs of said compass system, said navigation receiver and said distance-measuring receiver to combine them and to supply an input to said indicating means, and the combining means controlling the indicating means so that its maximum response varies inversely with distance from said ground station and as a function of the distance-measuring and the navigation receivers.

8. A navigation system according to claim 7 wherein the combining means varies the response of the indicating means as a function of the sine of the difference angle between the radial bearing angle of the navigation receiver and the heading of the aircraft.

9. A navigation system according to claim 7 wherein said combining means includes a driving means, a gating circuit connected to said driving means, a variable period pulse generator connected to said gating circuit and receiving an input from said distance-measuring receiver, an omnibearing selector connected to said driving means, an omnibearing indicator connected to said driving means, a differential connected to said driving means, said compass system connected to said differential, the output of said differential connected in circuit with said variable period pulse generator and the output of said omnibearing indicator connected to said indicating means.

10. A navigation system according to claim 9 comprising, an angular difference rectifier connected between said differential and said variable period pulse generator.

11. A navigation system according to claim 10 comprising a variable gain amplifier connected between said differential and said variable period pulse generator.

12. A method of aircraft navigation comprising the steps of determining the aircraft bearing relative to a radio line of position, determining the aircraft heading, determining the aircaft's distance from a fixed location and varying the response of the navigation system as a function of the aircraft's distance from the fixed location, its heading and its bearing relative to the radio line of position.

* * * * *